(12) United States Patent
Zhang

(10) Patent No.: US 9,078,240 B2
(45) Date of Patent: Jul. 7, 2015

(54) METHODS AND APPARATUSES FOR CONNECTING A CELLULAR PHONE WITH A FIXED PHONE UNDER INSTRUCTION OF A SMALL BASE STATION

(71) Applicant: QUALCOMM Incorporated, San Diego, CA (US)

(72) Inventor: Jian Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 146 days.

(21) Appl. No.: 13/790,337

(22) Filed: Mar. 8, 2013

(65) Prior Publication Data

US 2014/0256314 A1 Sep. 11, 2014

(51) Int. Cl.
*H04W 4/00* (2009.01)
*H04W 76/02* (2009.01)
*H04M 3/42* (2006.01)
*H04M 1/725* (2006.01)
*H04M 3/46* (2006.01)

(52) U.S. Cl.
CPC ............ *H04W 76/025* (2013.01); *H04M 1/725* (2013.01); *H04M 3/42263* (2013.01); *H04M 3/465* (2013.01); *H04M 2203/1091* (2013.01); *H04M 2203/2094* (2013.01)

(58) Field of Classification Search
CPC ...................................................... H04M 1/725
See application file for complete search history.

(56) References Cited

U.S. PATENT DOCUMENTS 8,050,672 B2 * 11/2011 Luo et al. .................... 455/426.1
8,249,604 B2 8/2012 Abichandani et al.
2004/0132500 A1 * 7/2004 Rogalski et al. ............ 455/569.1
2007/0036098 A1 * 2/2007 Jain et al. ...................... 370/328
2009/0067417 A1 3/2009 Kalavade et al.
2010/0144341 A1 * 6/2010 Robbins et al. ............. 455/426.1
2010/0151868 A1 * 6/2010 Shinozaki ...................... 455/445
2010/0210239 A1 8/2010 Karaoguz et al.
2011/0249658 A1 10/2011 Wohlert et al.
2012/0021739 A1 * 1/2012 Frank et al. ................. 455/426.1
2013/0155170 A1 * 6/2013 Eichen et al. ............... 348/14.02

FOREIGN PATENT DOCUMENTS

EP         2197223 A2    6/2010
WO   WO-9809425 A1    3/1998

OTHER PUBLICATIONS

International Search Report and Written Opinion—PCT/US2014/020793—Jun. 5, 2014, 12 pages.

* cited by examiner

*Primary Examiner* — William Nealon
(74) *Attorney, Agent, or Firm* — Arent Fox LLP

(57) ABSTRACT

The present disclosure presents methods and apparatuses for carrying out a wireless call at a small base station via one of multiple available phones, which may include a fixed phone and a cellular phone. For instance, some example methods described in the present disclosure may include establishing communication with a cellular phone and a fixed phone and transmitting a connection command message to each of the cellular phone and the fixed phone commanding the cellular phone and fixed phone to establish a communicative connection. Furthermore, such example methods may include receiving a cellular phone call indication message from a network indicating the existence of an incoming call request for the cellular phone, transmitting a paging message associated with the incoming call request to the cellular phone, and executing a voice call, wherein the call is conducted by one of either the cellular phone and the fixed phone.

32 Claims, 9 Drawing Sheets

METHODS AND APPARATUSES FOR CONNECTING A CELLULAR PHONE WITH A FIXED PHONE UNDER INSTRUCTION OF A SMALL BASE STATION

BACKGROUND

1. Field

Aspects of the present disclosure relate generally to wireless communication systems, and more particularly, to executing a voice call from one of a fixed phone and a cellular phone.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications.

These developments have led to an increase in cellular phone ownership worldwide and a related demand for ease of cellular phone ownership—including when used at home. For example, by nature of their portability, cellular phones are typically smaller than home phones and are not tethered to a portion of a traditional landline phone, or "fixed phone." These characteristics of cellular phones vis-à-vis traditional fixed home phones make cellular phones susceptible to being temporarily lost or misplaced, for example, in crevices in a recliners and couches or under desktop items. This can lead to missed incoming phone calls due to muffled ringtones or inaudible and intangible cell phone vibration. In many instances, however, though an incoming call on a cellular phone may be easily missed if the cell phone is misplaced at home, these same homes often have traditional fixed phones available that are immobile and sufficiently loud to alert a user of an incoming call on the landline. Methods for utilizing such fixed phones to ring in place of, or concurrent with, the misplaced cell phone and for executing the incoming call with the caller using the fixed phone would be advantageous for overall user experience.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include methods and apparatuses for executing a voice call associated with a cellular phone at a small base station (e.g. a femtocell, microcell, picocell, etc.) using one of multiple available phones, which may include the cellular phone itself or a fixed phone in communicative connection with the cellular phone. For example, the present disclosure presents a method for carrying out a wireless call at a small base station, which may include establishing communication with a cellular phone and a fixed phone and transmitting a connection command message to each of the cellular phone and the fixed phone commanding the cellular phone and fixed phone to establish a communicative connection. Additionally, the example method includes receiving a cellular phone call indication message from a network indicating the existence of an incoming call request for the cellular phone, transmitting a paging message associated with the incoming call request to the cellular phone, and executing a call associated with the incoming call request, wherein the call is conducted by one of either the cellular phone and the fixed phone depending upon which phone is answered first in time.

Additionally, the present disclosure describes an apparatus for wireless communication, which may include means for establishing communication with a cellular phone and a fixed phone and means for transmitting a connection command message to each of the cellular phone and the fixed phone commanding the cellular phone and fixed phone to establish a communicative connection. Furthermore, such an example apparatus may include means for receiving a cellular phone call indication message from a network indicating the existence of an incoming call request for the cellular phone, means for transmitting a paging message associated with the incoming call request to the cellular phone, and means for executing a call associated with the incoming call request, wherein the call is conducted by one of either the cellular phone and the fixed phone.

In addition, the present disclosure presents an example computer program product, which may include a computer-readable medium comprising code for establishing communication with a cellular phone and a fixed phone and code for transmitting a connection command message to each of the cellular phone and the fixed phone commanding the cellular phone and fixed phone to establish a communicative connection. Moreover, the computer-readable medium may include code for receiving a cellular phone call indication message from a network indicating the existence of an incoming call request for the cellular phone, code for transmitting a paging message associated with the incoming call request to the cellular phone, and code for executing a call associated with the incoming call request, wherein the call is conducted by one of either the cellular phone and the fixed phone.

Additionally, the present disclosure describes an example apparatus for wireless communication, which may include at least one processor and a memory coupled to the at least one processor, wherein the at least one processor is configured to establish communication with a cellular phone and a fixed phone and to transmit a connection command message to each of the cellular phone and the fixed phone commanding the cellular phone and fixed phone to establish a communicative connection. Furthermore, the at least one processor may be configured to receive a cellular phone call indication message from a network indicating the existence of an incoming call request for the cellular phone, transmit a paging message associated with the incoming call request to the cellular phone, and execute a call associated with the incoming call request, wherein the call is conducted by one of either the cellular phone and the fixed phone.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
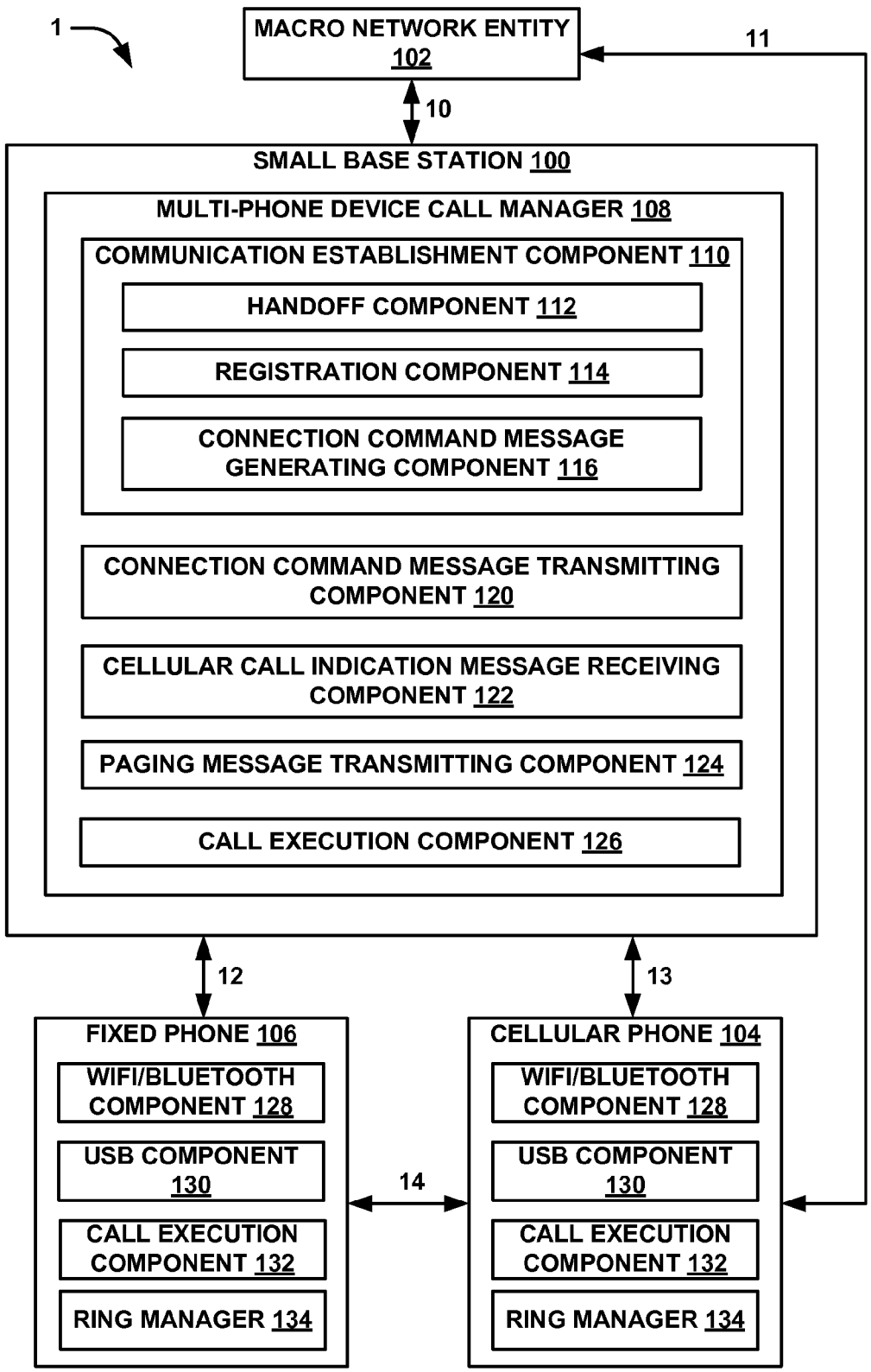
FIG. 1 is a block diagram illustrating an example communication system of aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure provides methods and apparatuses for executing a call to a cellular phone via either the cell phone or a fixed phone. For example, in an aspect, a small base station (e.g. femtocell) serving the home of a cell phone user may establish a communicative connection with a fixed phone in the home. Next, the user may return home with his or her cellular phone, which may trigger either cell phone handoff from a macro network entity (e.g. a macro base station or other access point external to the home) to the small base station located in the home. Upon authentication of the cell phone by the small base station, the small base station may command the fixed phone to set up a communicative connection (e.g. a Bluetooth connection) with the cell phone or vice versa.

Thereafter, if the small base station receives an indication from a core network that an incoming call from another device directed to the cell phone exists, the small base station can page the cell phone. In some examples, the small base station may inform the fixed phone that the cell phone is being paged or has recently been paged via the previously established connection between the small base station and the fixed phone, which may cause the fixed phone to ring (e.g. concurrent to the cell phone ringing). In a further aspect, the user may answer the call using either of the cell phone and the fixed phone. Additionally, if a user answers the fixed phone, the cell phone may receive the voice data associated with the call from the small base station via a voice signal and may transmit the incoming voice signal to the fixed phone to allow the user to complete the call on the fixed phone. In alternative scenarios, the user may answer the cell phone instead of the fixed phone, at which point the cell phone or small base station may transmit a signal to the fixed phone to command the fixed phone to stop ringing.

In an optional aspect, the fixed phone may connect to more than one cell phone at any given time, but the effectiveness of such multiple connectivity may be limited in that the fixed phone may be configured to engage in only a single voice call at a given time. Furthermore, in an example additional aspect, the small base station may be configured to instruct the fixed phone to release the previously established communicative connection between the fixed phone and a cell phone if the cell phone is powered off, loses battery power, and/or exits a geographical coverage area associated with the small base station.

Referring to FIG. 1, a wireless communication system 1 is illustrated for executing cellular calls on one of multiple phone devices, including cellular phones and fixed phones. System 1 may include a cellular phone 104 ("cell phone") that may communicate with one or more wireless network access devices, such as, but not limited to a macro network entity 102 and a small base station 100. In some examples, cellular phone 104 may communicate with macro network entity 102 via a wireless link 11 (e.g. a cellular connection) and may communicate with small base station 100 via a communication link 13, which may be wireless (e.g. a Bluetooth connection, cellular wireless connection, etc.) or wired (e.g. USB connection). In an aspect, wireless network entity 102 may be a wireless access point, such as, but not limited to, a base station (BS) or NodeB, a relay, a peer-to-peer device, a radio network controller (RNC), an authentication, authorization and accounting (AAA) server, a mobile switching center (MSC), or any other wireless network device.

In an aspect, small base station 100 may serve as a personal or home wireless network access point that may be configured to provide wireless network access to one or more of cellular phone 104 and fixed phone 106. For example, small base station 100 may be a picocell, piconode, femtocell, femtonode, WiFi access point, etc., that can enable cellular phone 104 to communicate and/or that can establish and maintain one or more wireless communication links, such as wireless communication link 13.

Further, in an aspect, cellular phone 104 may include a multi-phone device call manager 108, which may be configured to manage voice communication in system 1, which allows a call intended for cellular phone 104 to be executed by either of cellular phone 104 or fixed phone 106. Multi-phone device call manager 108 may include a communication establishment component, which may be configured to trigger and otherwise manage establishment of communication links in system 1. For example, in an aspect, communication establishment component 110 may be configured to establish and/or terminate communication link 12 between small base station 100 and fixed phone 106.

In addition, communication establishment component 110 may be configured to establish communication link 13 between small base station 100 and cellular phone 104. For example, in a non-limiting aspect, where communication link 13 is a wireless link, a handoff component 112 of communication establishment component 110 (and/or a handoff component located in another network device) may initiate, control, and/or perform a service handoff (or "handover") of cellular phone 104, for example, when cellular phone 104 moves from outside the wireless coverage area of small base station 100 (e.g. when being served by macro network entity 102) and into the wireless coverage area of small base station 100. Such a handoff may be, but is not limited to, hard handoff, soft handoff, or softer handoff. In some examples, macro network entity 102 may be a pre-handoff serving device and small base station 100 may be a post-handoff serving device to which the cellular phone 104 reselects, thus receiving wireless service from small base station 100 upon reselection. In an aspect of the present disclosure, for example, a user of cellular phone 104 may leave home with his or her cellular phone 104 and may travel outside the wireless coverage area of small base station 100. In such an example, the handoff component 112 may later determine, based on monitoring cellular phone measurement reports and/or handover commands received from a radio network controller or other network controller (not shown) that cellular phone 104 has entered the wireless coverage area of small base station 100, for example while or after being served wirelessly by a macro network associated with macro network entity 102.

In an additional aspect, communication establishment component 110 may include a registration component 114, which may be configured to authenticate cellular phone 104. In other words, where not every wireless device is permitted to utilize small base station 100 for wireless communication services (e.g. where small base station 100 has an associated closed subscriber group (CSG) of subscribing devices), registration component 114 may be configured to request and receive (and/or otherwise obtain) a key, subscription code, cellular phone identifier, or other authentication information associated with cellular phone 104. In addition, registration component 114 may be configured to cross-check such authentication information, for example, against a master key list, private key list, subscriber list, or the like to determine whether communication establishment component 110 is permitted to access wireless services via small base station 100. If registration component 114 determines that permission is granted, communication establishment component 110 or a component therein may initiate establishment of communication link 13 between small base station 100 and cellular phone 104 (e.g. during handoff managed by handoff component 112).

In addition, communication establishment component 110 may include a connection command message generating component 116, which may be configured to generate a connection command message that, when transmitted and received by fixed phone 106 (and, in some examples, cellular phone 104), commands the fixed phone (and/or the cellular phone 104) to establish communication link 14 between fixed phone 106 and cellular phone 104. In some aspects, connection command message generating component 116 may generate the connection command message after completing handoff of cellular phone 104 to small base station 100 and/or receiving or otherwise obtaining an indication from registration component 114 that cellular phone 104 is permitted to access wireless services via small base station 100. In a further aspect, multi-phone device call manager 108 may include a connection command message transmitting component 120, which may be configured to transmit the generated connection command message to one or both of fixed phone 106 and cellular phone 104.

In addition, multi-phone device call manager 108 may include a cellular call indication message receiving component 122, which may be configured to receive one or more cellular call indication messages from one or more macro network entities 102. In an aspect, such call indication messages may indicate that an incoming call associated with cellular phone 104 exists on the macro network and may cause multi-phone device call manager 108 (e.g. at a paging message transmitting component 124) to generate (or forward) a paging message to cellular phone 104 to inform the cellular phone 104 that an originating device is attempting to establish an active voice call with the cellular phone 104. In a further aspect, based on receiving the paging message transmitted by paging message transmitting component 124, a call execution component 132 may transmit one or more call establishment signals to the originating device and/or otherwise perform call establishment signaling via small base station 100, the macro network of macro network entity 102, and/or a core network (e.g. PSTN, the Internet) to establish an active call that may be carried out by either the cellular phone 104 or the fixed phone 106 (via communication link 14) depending upon which of the fixed phone 106 or cellular phone 104 is answered first. Where the cellular phone 104 is answered first, call execution component 126 may receive outgoing voice call data generated by cellular phone 104 via communication link 13 and address, process, decode, encode, modulate, or otherwise alter or add to such outgoing call data according to one or more communication protocols or standards utilized by either or both of a macro network associated with macro network entity 102 or a core network (e.g. PSTN or the Internet). Upon configuring the outgoing voice call data, the call execution component may additionally transmit the configured voice call data to the macro network and/or core network for eventual reception by a destination device likewise engaged in the active voice call.

Furthermore, the call execution component 126 may likewise be configured to transmit outgoing voice call data received from the cellular phone 104 via communication link 13 where the fixed phone answers the call first. In such a scenario, however, the fixed phone 106 (e.g. via call execution component 132 of fixed phone 106) may generate the outgoing voice call data and transmit the outgoing voice call data to the cellular phone 104 for forwarding to call execution component 126 for transmission to the other device or devices engaged in the voice call. Likewise, where the fixed phone 106 is answered before the cellular phone 104, incoming voice call data may be received by call execution component 126 and transmitted to cellular phone 104 for further transmission to fixed phone 106 (and optionally, call execution component 132 thereof) such that the user can hear the incoming voice call when transduced into audible waves. In other words, call execution component 126 may interface with the macro network (e.g. via macro network entity 102) and/or the core network to receive incoming voice call data originating from the other device (or devices) engaged in the active voice call and forwarded along to the fixed phone 106 even where the other device dialed a cellular phone number associated with cellular phone 104.

In a further aspect, as introduced above, system 1 may include one or more fixed phone 106, which may be each be a landline telephone device that may remain continuously physically connected to a telephone network (e.g. the public switched telephone network (PSTN) or the Internet for VoIP service) via a wired port while providing communication services. In some examples, the fixed phone 106 may include a handset that a user may place against his or her face during a call and a fixed phone base or dock that may connect to a wire connected to the port (e.g. a wall-mounted port). In some aspects, the fixed phone 106 may be a wireless fixed phone, meaning that the handset may communicate wirelessly with the fixed phone base or dock during the call. Alternatively, the fixed phone 106 may be a wired fixed telephone, wherein the handset may be connected to the fixed phone base or dock via a wire.

Furthermore, fixed phone 106 may be configured to communicate with cellular phone 104 and/or small base station 100 via communication links 14 and 12, respectively. In an aspect, communication link 14 may be a wired connection (e.g. a USB connection) and/or a wireless connection (e.g. a Bluetooth connection). In some aspects, where a user answers an incoming call at the fixed phone, communication link 14 may carry incoming voice data forwarded by the cellular phone 104 to the fixed phone 106. Additionally or alternatively, communication link 14 may carry outgoing user voice data generated during a call at the fixed phone to cellular phone 104 for eventual transmission to a receiving device partaking in the call. More specifically, the cellular phone 104 may receive the outgoing user voice data from the fixed phone and forward the outgoing user voice data (e.g. via communication link 13) to the small base station 100, which may forward the outgoing user voice data to the receiving device (e.g. via a core network such as the PSTN and/or the Internet).

In an additional aspect, communication link 12 may be a wired connection and/or a wireless connection (e.g. WiFi connection, Bluetooth connection). In an aspect, fixed phone 106 may receive one or more connection command messages from small base station 100 via communication link 12, which may command the fixed phone 106 to establish communication link 14 with cellular phone 104. In some aspects, communication link 12 may additionally carry incoming voice data forwarded from small base station 100 and/or outgoing user voice data generated and transmitted by fixed phone 106 during a voice call that utilizes fixed phone 106.

In an aspect, to facilitate such communication, fixed phone 106 may include a WiFi/Bluetooth component 128, which may be configured to manage wireless communication with one or both of cellular phone 104 and small base station 100 using, for non-limiting example, one or both of WiFi and Bluetooth communication standards. Specifically, WiFi/Bluetooth component 128 may be configured to modulate, encode, configure, parse, or otherwise alter user voice data generated at fixed phone 106 and transmit the altered data to one or both of cellular phone 104 and small base station 100 via communication links 14 and 12, respectively. Furthermore, WiFi/Bluetooth component 128 may be configured to receive signals transmitted from cellular phone 104 (e.g. incoming voice data) and/or small base station 100 (e.g. connection control message(s)) and demodulate, decode, or otherwise alter the received signals according to, by non-limiting example, the WiFi and/or Bluetooth standards.

Additionally, fixed phone 106 may include a USB component 130 that may configured to manage wired communication with small base station 100 using wired communication standards over a wired communication link (e.g. communication link 12), which may be a USB cable or any other wire or bus. Specifically, USB component 130 may be configured to modulate, encode, configure, parse, or otherwise alter user voice data generated at fixed phone 106 and transmit the altered data small base station 100 via communication link 12. Furthermore, USB component 130 may be configured to receive signals transmitted small base station 100 (e.g. connection control message(s)) and demodulate, decode, or otherwise alter the received signals according to, by non-limiting example, the USB, FireWire, Ethernet, MIDI, eSATA/eSATAp, Thunderbolt, Lightning, or any other wired communication standard.

Furthermore, fixed phone 106 may include a call execution component 132, which may be configured to execute a voice call with a receiving device also partaking in the call (not shown). In some non-limiting examples, call execution component 132 may be configured to establish communication link 14 (e.g. a wireless communication link such as a Bluetooth link) with cellular phone 104, convert audio voice input into digital and/or analog electrical voice signals, encode generated electrical voice signals according to a format compatible with one or more communication standards, transmit the encoded voice signals (e.g. to cellular phone 104 wirelessly), decode received voice signals according to one or more communication standards, convert the decoded voice signals to audio waves (e.g. by a speaker), and end the call upon call completion, along with other tasks associated with executing a wireless or traditional wired phone call.

In an additional aspect, fixed phone 106 may include a ring manager 134, which may be configured to manage the behavior of an audible ringer or tactile alert (e.g. vibration) generated by fixed phone 106. For example, in some aspects, ring manager 134 may receive a message from cellular phone 104 via communication link 14 that may indicate that the cellular phone 104 has received a page from small base station 100. Upon receiving this message, ring manager 134 may initiate a ring, ringtone, vibration pattern, or any other audible, visual, or tactile response that may alert a user that the cellular phone 104 is receiving an incoming call or related paging message. Further, where the call is answered at the fixed phone 106 before the fixed phone 106 receives a call answered message from the cellular phone via communication link 14, ring manager 134 may itself generate a call answered message and transmit the call answered message to cellular phone 104 to indicate to the cellular phone that the call will be executed by the fixed phone 106 and that the cellular phone 104 should terminate the ringing process.

In yet a further aspect, system 1 may include one or more cellular phones 104 that may be configured to engage in a voice call with another device (not shown) and/or facilitate communication of voice call data, ring commands or messages, and/or other signals between small base station 100 and fixed phone 106 where the fixed phone 106 is engaged in the voice call (e.g. the fixed phone 106 is answered before the cellular phone 104 is answered while ringing concurrently). In an aspect, cellular phone 104 may be a portable device capable of communicating voice call data, paging and control messages, or the like with a macro network (e.g. a wide area cellular network) via wireless link 11, and small base stations 100 and fixed phone 106 via a WiFi, Bluetooth, or similar communication link and/or a wired communication link (e.g. USB connection). In an aspect, cellular phone 104 may be (or may be referred to as) a user equipment (UE), mobile phone, mobile device, or any other voice call-capable wireless communication device.

Furthermore, cellular phone 104 may be configured to communicate with fixed phone 106 and/or small base station 100 via communication links 14 and 13, respectively. In an aspect, cellular phone 104 may receive one or more connection command messages from small base station 100 via communication link 13, which may command the cellular phone 104 to establish communication link 14 with fixed phone 106. In an aspect, to facilitate voice call communication with small base station 100 and/or fixed phone 106, cellular phone 104 may include a WiFi/Bluetooth component 128, which may be configured to manage wireless communication with one or both of fixed phone 106 and small base station 100 using, for non-limiting example, one or both of WiFi and Bluetooth communication standards. Specifically, WiFi/Bluetooth component 128 may be configured to modulate, encode, configure, parse, or otherwise alter user voice data generated at cellular phone 104 and transmit the altered data to small base station 100 via communication link 13. Furthermore, WiFi/Bluetooth component 128 may be configured to receive signals transmitted from fixed phone 106 (e.g. outgoing voice call data for forwarding to small base station 100) and/or small base station 100 (e.g. connection control message(s)) and demodulate, decode, or otherwise alter the received signals according to, by non-limiting example, the WiFi and/or Bluetooth standards.

Additionally, cellular phone 104 may include a USB component 130 that may be configured to manage wired communication with fixed phone 106 (and, potentially, small base station 100) using wired communication standards over a wired communication link (e.g. communication link 14), which may be a USB cable or any other wire or bus. Specifically, USB component 130 may be configured to modulate, encode, configure, parse, or otherwise alter user voice data generated at cellular phone 104 and transmit the altered data to small base station 100 via communication link 13, which, in some examples, may be a wired link. Furthermore, USB component 130 may be configured to receive signals transmitted by small base station 100 (e.g. connection control message(s)) and demodulate, decode, or otherwise alter the received signals according to, by non-limiting example, the USB, FireWire, Ethernet, MIDI, eSATA/eSATAp, Thunderbolt, Lightning, or any other wired communication standard.

Furthermore, cellular phone 104 may include a call execution component 132, which may be configured to execute a voice call with another device also partaking in the call (not shown). In some non-limiting examples, call execution component 132 may be configured to establish communication link 14 (e.g. a wireless communication link such as a Bluetooth link) with fixed phone 106, convert audio voice input into digital and/or analog electrical voice signals, encode generated electrical voice signals according to a format compatible with one or more communication standards, transmit the encoded voice signals (e.g. to small base station 100), decode received voice signals according to one or more communication standards, convert the decoded voice signals to audio waves (e.g. by a speaker), and end the call upon call completion, along with other tasks associated with executing a wireless or traditional wired phone call. Furthermore, call execution component 132 of cellular phone 104 may be configured to receive outgoing voice call data signals from the fixed phone 106 destined for another device with which the call is being engaged, and forward or otherwise transmit this received voice call data to the small base station 100 for eventual transmission to this other device (or devices). Likewise, call execution component 132 of cellular phone 104 may be configured to receive incoming voice call data from small base station 100, which may have been generated and originally transmitted by the other device engaged in the voice call. Where the fixed phone 106 is engaging in the voice call (e.g. the fixed phone 106 was answered first), the call execution component 132 of cellular phone 104 may forward or otherwise transmit this incoming voice call data to the fixed phone 106 via communication link 14. Furthermore, call execution component 132 of cellular phone 104 may be configured to terminate the voice call where either another component of cellular phone 104 or the fixed phone 106 indicates that the voice call should be terminated.

In an additional aspect, cellular phone 104 may include a ring manager 134, which may be configured to manage the behavior of an audible ringer or tactile alert (e.g. vibration) generated by cellular phone 104, for example, when the cellular phone 104 receives a paging message. or "page," from small base station 100. Additionally, ring manager 134 may be configured to generate a fixed phone ring command upon receiving such a paging message and may transmit this fixed phone ring command to fixed phone 106. In an aspect, the fixed phone ring message may command the fixed phone 106 or a component therein (e.g. ring manager 134) to initiate a ring, voice call alert, vibration, or any other audible, visual, or tactile alert substantially concurrent to the cellular phone 104 ringing due to receiving the paging message.

Further, where the voice call associated with the paging message is answered at the cellular phone 104 before the fixed phone 106 answers the call (e.g. the cellular phone has not received an answered message from the fixed phone 106 before the call is answered at the cellular phone 104) ring manager 134 may itself generate a call answered message and transmit the call answered message to fixed phone 106 to indicate to the fixed phone 106 that the call will be executed by the cellular phone 104 and that the fixed phone 106 (e.g. via ring manager 134 of fixed phone 106) should terminate the ringing process.

In addition, for purposes of the present disclosure, the communication technology or radio access technology (RAT) used for communication between one or more of cellular phone 104, fixed phone 106, small base station 100, and/or macro network entity 102 may be of a 3G technology type, such as, but not limited to, data optimized (DO), WCDMA, Time Division Synchronous Code Division Multiple Access (TDS-CDMA), or any other third-generation mobile communications technology. Additionally, in some examples, the communication technology may be a 2G technology type, such as, but not limited to, GSM, GPRS, or EDGE. Furthermore, example RAT types may include more advanced RATs, such as, but not limited to, Long-Term Evolution (LTE), Time-Division Long-Term Evolution (TD-LTE), or any other fourth-generation mobile communications technology. Alternatively or additionally, any other communication technology type may be used for such communication.

Figure 2:
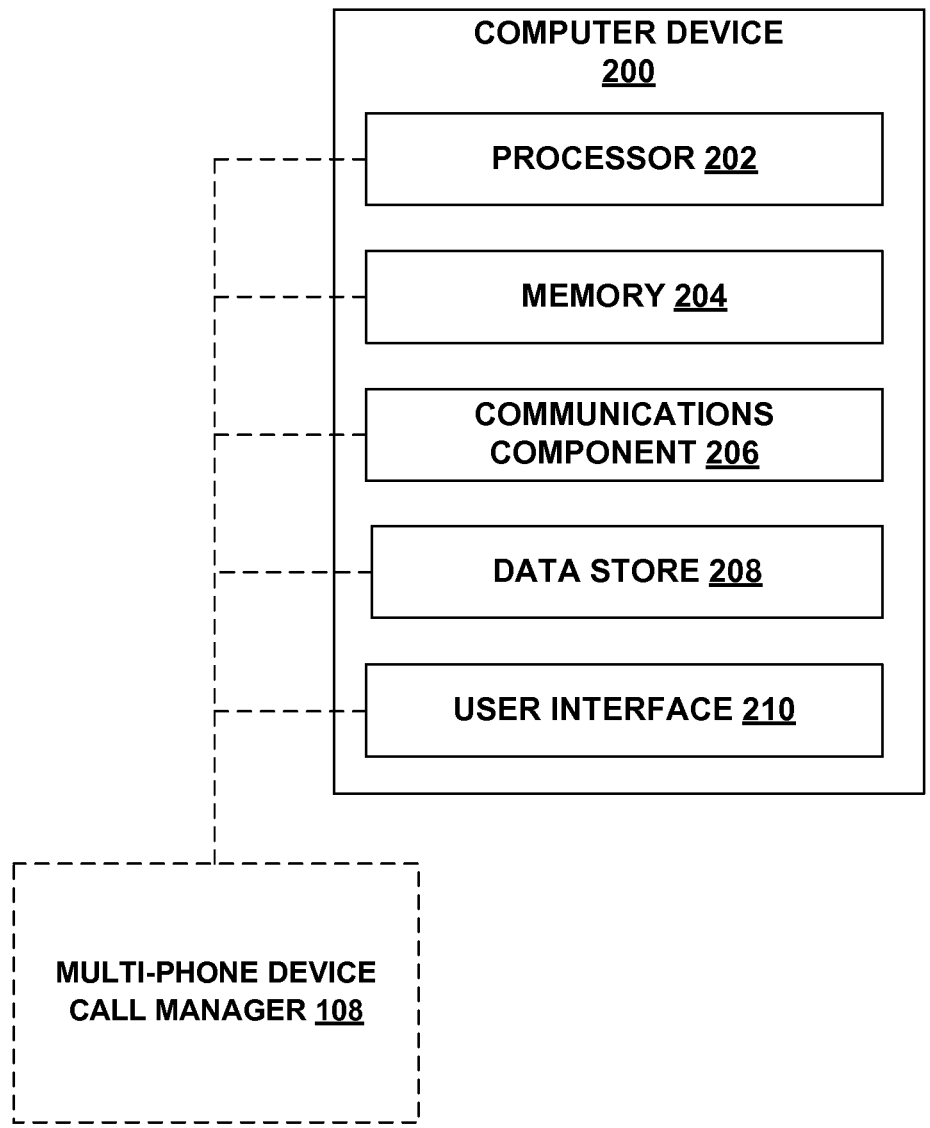
FIG. 2 is a block diagram illustrating an example of an example computer device in aspects of the present disclosure.

Referring to FIG. 2, in one aspect, any of small base station 100, macro network entity 102, cellular phone 104, and fixed phone 106 of FIG. 1 may be represented by a specially programmed or configured computer device 200. Computer device 200 includes a processor 202 for carrying out processing functions associated with one or more of components and functions described herein. Processor 202 can include a single or multiple set of processors or multi-core processors. Moreover, processor 202 can be implemented as an integrated processing system and/or a distributed processing system. Additionally, processor 202 may be configured to concatenate data received over a frame or several frames during a communication, such as, but not limited to, a voice call.

Computer device 200 further includes a memory 204, such as for storing data used herein and/or local versions of applications being executed by processor 202. Memory 204 can include any type of memory usable by a computer, such as random access memory (RAM), read only memory (ROM), tapes, magnetic discs, optical discs, volatile memory, non-volatile memory, and any combination thereof.

Further, computer device 200 includes a communications component 206 that provides for establishing and maintaining communications with one or more parties utilizing hardware, software, and services as described herein. Communications component 206 may carry communications between components on computer device 200, as well as between computer device 200 and external devices, such as devices located across a communications network and/or devices serially or locally connected to computer device 200. For example, communications component 206 may include one or more buses, and may further include transmit chain components and receive chain components associated with a transmitter and receiver, respectively, or a transceiver, operable for interfacing with external devices. In an additional aspect, communications component 206 may be configured to receive one or more pages and/or page indicators from one or more subscriber networks and may also be configured to execute wired and/or wireless communication of a voice call between two or more devices. In an aspect, communications component 206 may represent or may include call execution component 126 of small base station 100 and/or call execution component 132 of one or both of fixed phone 106 and cellular phone 104.

Additionally, computer device 200 may further include a data store 208, which can be any suitable combination of hardware and/or software, that provides for mass storage of information, databases, and programs employed in connection with aspects described herein. For example, data store 208 may be a data repository for applications not currently being executed by processor 202.

Computer device 200 may additionally include a user interface component 210 operable to receive inputs from a user of computer device 200, and further operable to generate outputs for presentation to the user. User interface component 210 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 210 may include one or more output devices, including but not limited to a display, a speaker, a haptic feedback mechanism, a printer, any other mechanism capable of presenting an output to a user, or any combination thereof.

In a small base station or femtocell implementation, such as for small base station 100 of FIG. 1, computer device 200 may include a multi-phone device call manager 108 (FIG. 1), such as in specially programmed computer readable instructions or code, firmware, hardware, or some combination thereof.

Figure 3:
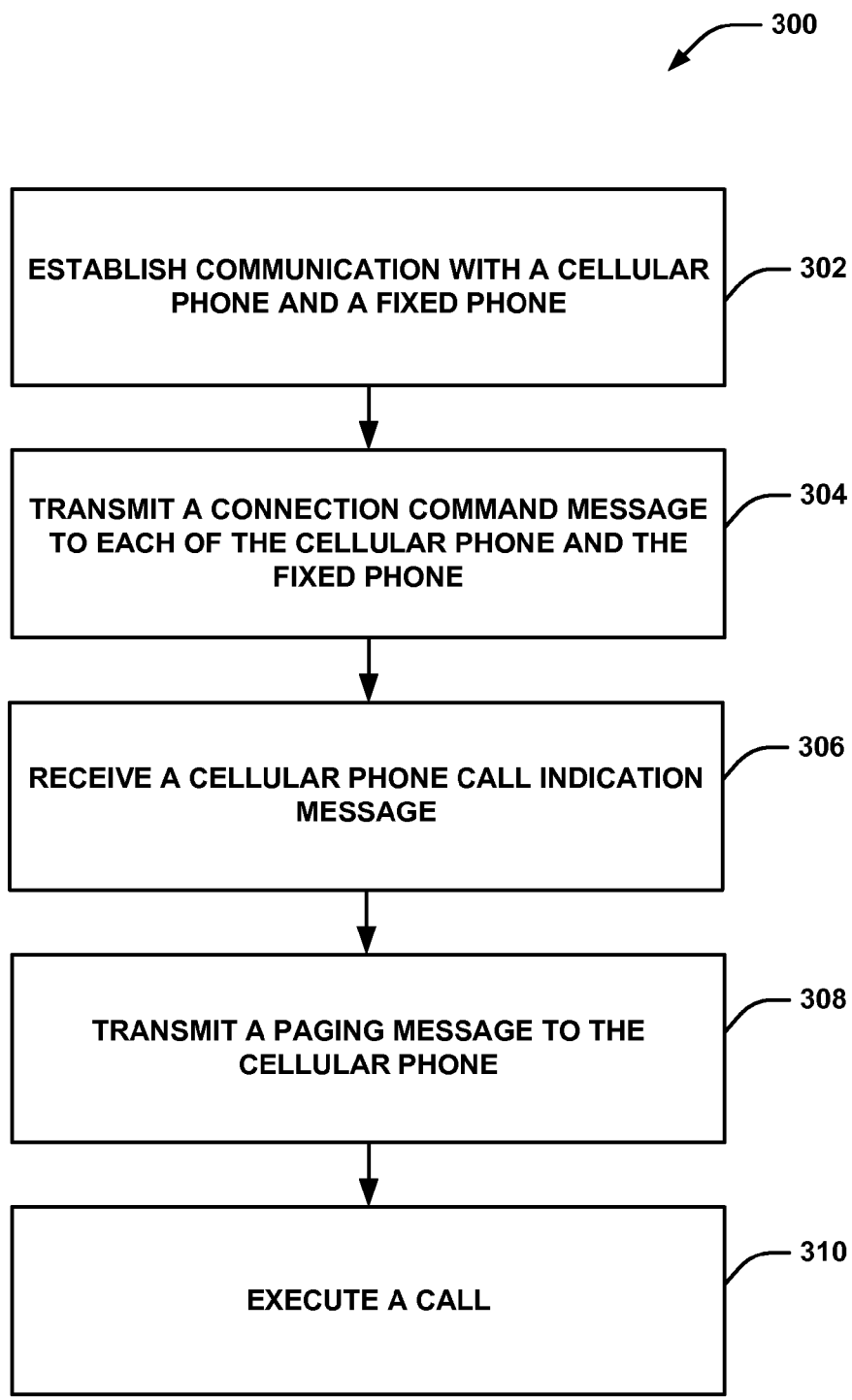
FIG. 3 is a flow diagram illustrating aspects of a method for multi-phone call execution as provided by the present disclosure.

Referring to FIG. 3, an example methodology 300 for executing a voice call associated with a cellular phone using either the cellular phone or a fixed phone communicatively connected to the cellular phone is presented. In an aspect, methodology 300 may be performed by components associated with a small base station (e.g. femtocell, personal wireless network access point, or small base station 100 of FIG. 1). Additionally, the methodology 300 is shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In an aspect, at block 302, a small base station (e.g. small base station 100 and/or communication establishment component 110 therein, FIG. 1) may establish communication with a cellular phone and a fixed phone. In an aspect, establishing communication with the cellular phone may include a handoff component (e.g. handoff component 112 of small base station 100 of FIG. 1) handing off the cellular phone from a network entity (e.g. a macro network entity such as macro network entity 102) to the small base station, wherein the network entity previously served as a serving cell for the cellular phone. For example, this may occur when a cellular phone user is outside the coverage area of the small base station (e.g. outside of the home of the user where the small base station coverage area is substantially similar to the area covered by the home) and returns to the small base station coverage area to which the cellular phone is a subscriber (e.g. the user returns home with the cellular phone on his or her person). In some examples, establishing communication with the cellular phone may further include a registration component (e.g. registration component 114) registering the cellular phone with the small base station and/or determining, for example, based on the registration, whether or not the cellular phone is a subscriber device associated with the small base station. In a related aspect, the registration component may further deny communication establishment with the cellular phone where the cellular phone is not determined to be a subscriber device.

Additionally, at block 304, the small base station and/or a component therein (e.g. connection command message generating component 116 and/or connection command message transmitting component 120 of FIG. 1) may generate and/or transmit a connection command message to each of the cellular phone and the fixed phone. Furthermore, at block 306, the small base station or component therein (e.g. cellular call indication message receiving component 122 of FIG. 1) may receive a cellular phone call indication message, for example, from a macro network or core network. Based upon receiving the cellular phone call indication message at 306, the small base station or a component therein (e.g. paging message transmitting component 124) may generate and/or transmit a paging message to the cellular phone, for example, to inform the cellular phone that an incoming call is waiting or impending and destined for or associated with the small base station.

In some aspects, based on receiving the paging message from the small base station, the cellular phone may initiate a ringing process at the cellular phone to alert the user of the incoming call. Additionally, the cellular phone may substantially concurrently generate and transmit a ring command to the fixed phone, which, when received by the fixed phone, may cause the fixed phone to ring substantially concurrently with the ringing of the cellular phone.

Additionally, in an aspect, the small base station (e.g. utilizing call execution component 126) may execute a call at block 310, which may be a voice call. In some aspects, executing the call at block 310 may include forwarding outgoing voice call data generated and/or originating at the fixed phone or the cellular phone (depending upon which of the fixed phone or the cellular phone are answered first in time) to another communication device partaking in the voice call. Furthermore, executing the call at block 310 may include forwarding incoming voice call data from the other communication device on the call to the cellular phone, which may further transmit or otherwise forward the incoming voice call data to the fixed phone via a communicative connection when the fixed phone was answered first in time. In an additional aspect, executing the call at block 310 may include terminating the call upon an indication from one or more of the fixed phone, the cellular phone, and the other phone partaking in the voice call.

Figure 4:
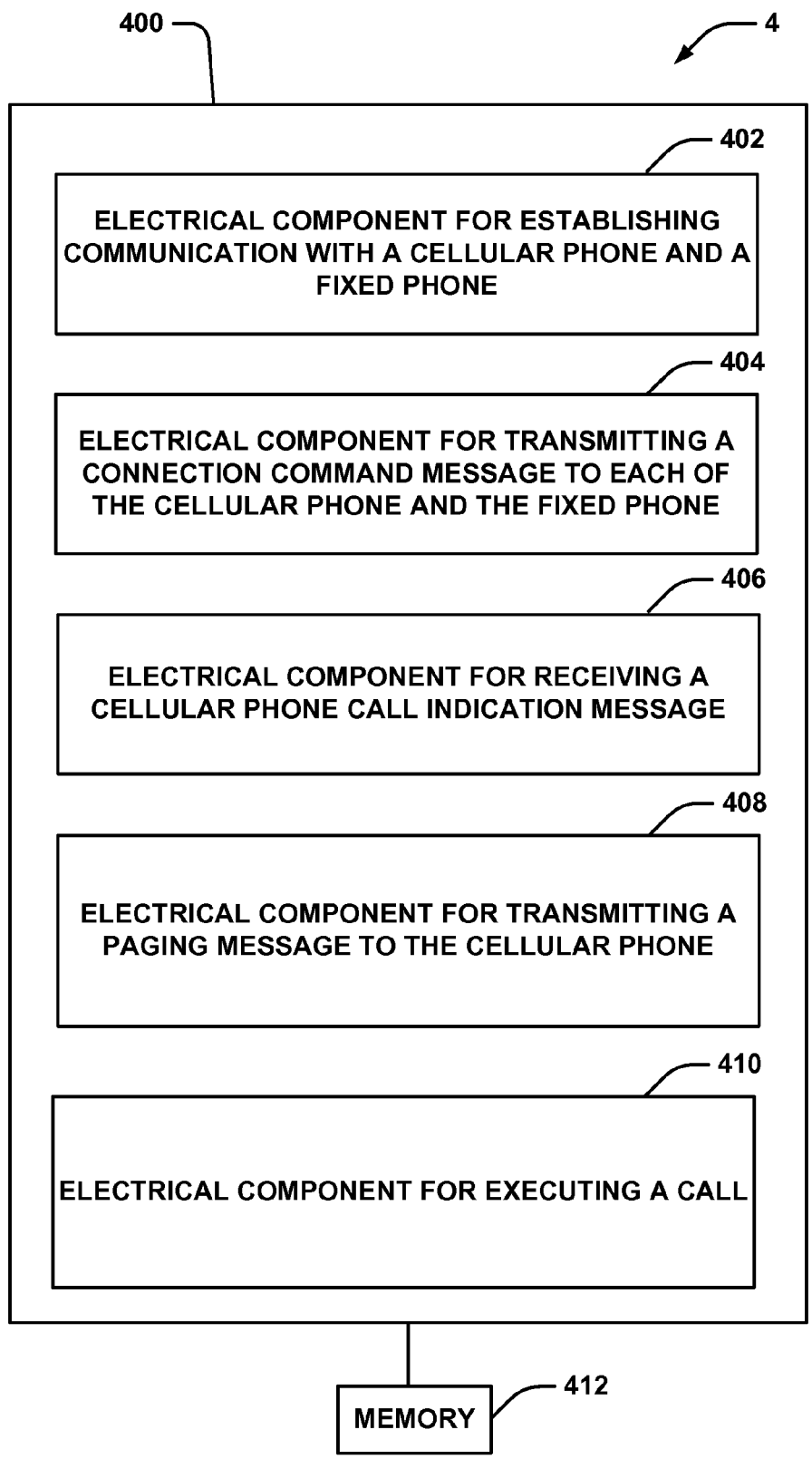
FIG. 4 is a component diagram illustrating aspects of a logical grouping of electrical components as contemplated by the present disclosure.

Referring to FIG. 4, an example system 4 is displayed for executing a voice call using one of multiple possible phones in a system, which may include a fixed phone and a cellular phone. For example, system 4 can reside at least partially within one or more small base stations (e.g. small base station 100 of FIG. 1). It is to be appreciated that system 4 is represented as including functional blocks, which can be functional blocks that represent functions implemented by a processor, software, or combination thereof (e.g., firmware). System 4 includes a logical grouping 400 of electrical components that can act in conjunction. For instance, logical grouping 400 can include an electrical component 402 for establishing communication with a cellular phone and a fixed phone. In an aspect, electrical component 402 may comprise communication establishment component 110 (FIG. 1). In addition, logical grouping 400 can include an electrical component 404 for transmitting a connection command message to each of the cellular phone and the fixed phone. In an aspect, electrical component 404 may comprise one or both of connection command message generating component 116 and connection command message transmitting component 120 (FIG. 1). In an additional aspect, logical grouping 400 can include an electrical component 406 for receiving a cellular phone call indication message. In an aspect, electrical component 406 may comprise cellular call indication message receiving component 122 of FIG. 1. Furthermore, logical grouping 400 can include an electrical component 408 for transmitting a paging message to the cellular phone. In an aspect, electrical component 408 may comprise paging message transmitting component 124 of FIG. 1. In addition, logical grouping 400 can include an electrical component 410 for executing a call, such as a voice call. In an aspect, electrical component 410 may comprise call execution component 126 of FIG. 1.

Additionally, system 4 can include a memory 412 that retains instructions for executing functions associated with the electrical components 402, 404, 406, 408, and 410, stores data used or obtained by the electrical components 402, 404, 406, 408, and 410, etc. While shown as being external to memory 412, it is to be understood that one or more of the electrical components 402, 404, 406, 408, and 410 can exist within memory 412. In one example, electrical components 402, 404, 406, 408, and 410 can comprise at least one processor, or each electrical component 402, 404, 406, 408, and 410 can be a corresponding module of at least one processor. Moreover, in an additional or alternative example, electrical components 402, 404, 406, 408, and 410 can be a computer program product including a computer readable medium, where each electrical component 402, 404, 406, 408, and 410 can be corresponding code.

Figure 5:
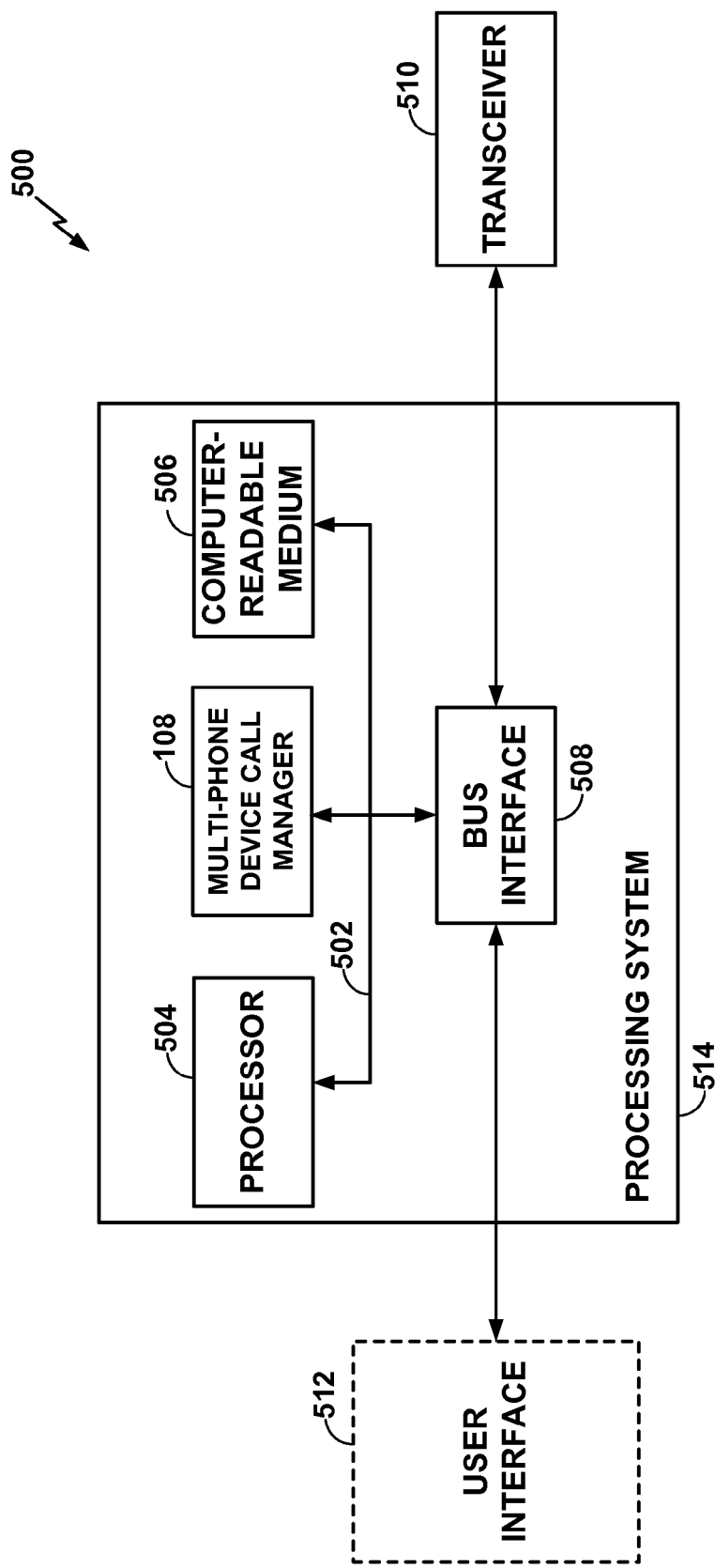
FIG. 5 is a block diagram illustrating an example of a hardware implementation for an apparatus employing a processing system.

FIG. 5 is a block diagram illustrating an example of a hardware implementation for an apparatus 500 employing a processing system 514 for carrying out aspects of the present disclosure, such as methods for improved cell (e.g. CSG cell) scanning and discovery through maintenance of a fingerprinting database. In this example, the processing system 514 may be implemented with a bus architecture, represented generally by a bus 502. The bus 502 may include any number of interconnecting buses and bridges depending on the specific application of the processing system 514 and the overall design constraints. The bus 502 links together various circuits including one or more processors, represented generally by the processor 504, and computer-readable media, represented generally by the computer-readable medium 506, and one or more components described herein, such as, but not limited to, the multi-phone device call manager 108. The bus 502 may also link various other circuits such as timing sources, peripherals, voltage regulators, and power management circuits, which are well known in the art, and therefore, will not be described any further. Furthermore, the bus 502 may link processor 504, computer-readable medium 506, and bus interface 508 to a multi-phone device call manager 108, which may be the multi-phone device call manager 108 of FIG. 1. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506, such as, but not limited to software or other machine-executable instructions for performing the functions of multi-phone device call manager 108 described throughout the present disclosure. It should be noted that the multi-phone device call manager 108 architecture is implemented, in an example, by software executed by a processor 504 at, for example, the network (e.g. Node B) and/or UE. Additionally, the software, when executed by the processor 504, causes the processing system 514 to perform the various functions described infra for any particular apparatus. The computer-readable medium 506 may also be used for storing data that is manipulated by the processor 504 when executing software.

The various concepts presented throughout this disclosure may be implemented across a broad variety of telecommunication systems, network architectures, and communication standards.

Figure 6:
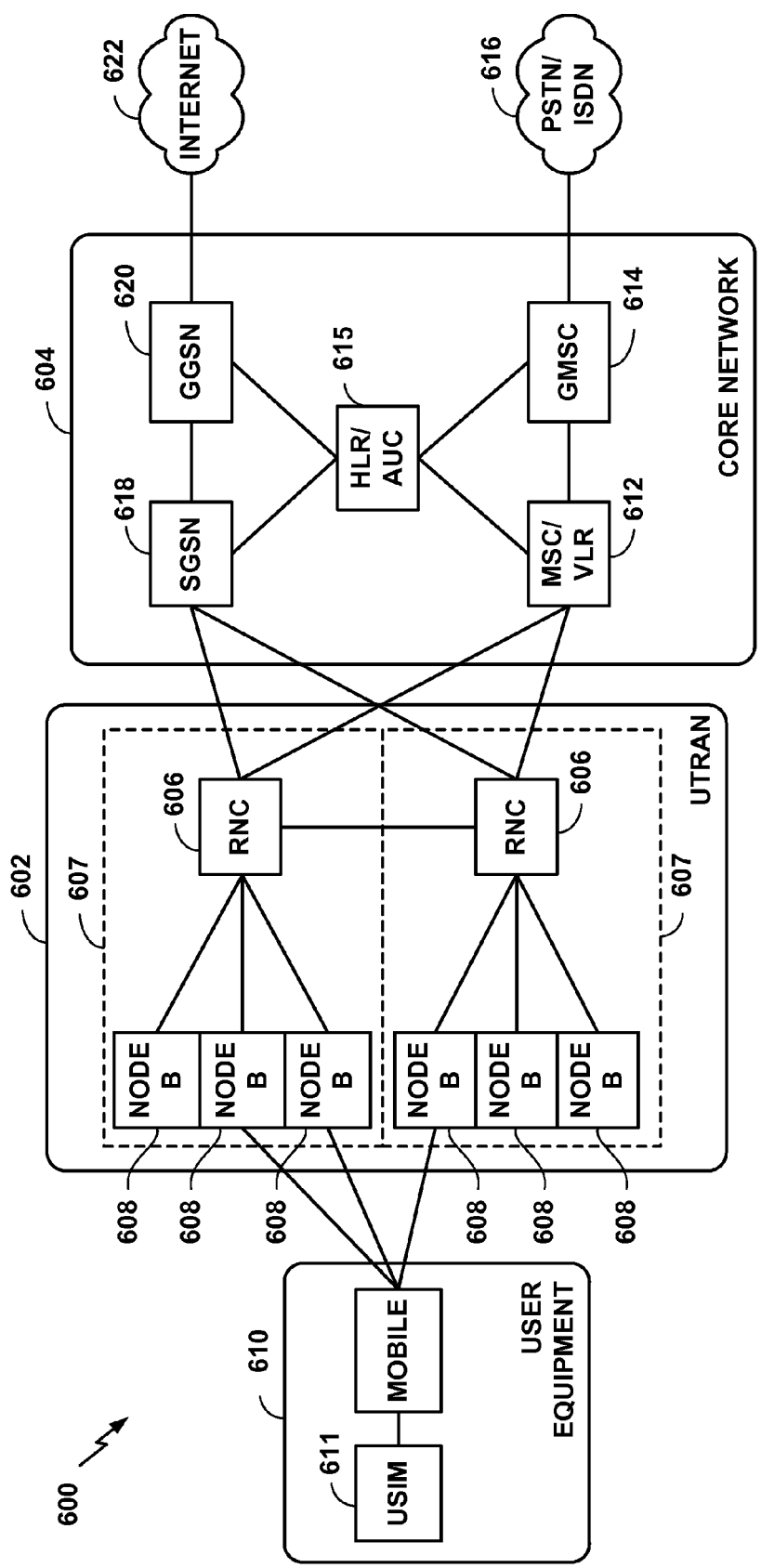
FIG. 6 is a block diagram conceptually illustrating an example of a telecommunications system.

By way of example and without limitation, the aspects of the present disclosure illustrated in FIG. 6 are presented with reference to a UMTS system 600 employing a W-CDMA air interface, which may facilitate execution of one or methods contemplated by the present disclosure. A UMTS network includes three interacting domains: a Core Network (CN) 604, a UMTS Terrestrial Radio Access Network (UTRAN) 602, and User Equipment (UE) 610. In an aspect, UE 610 may be cellular phone 104 (FIG. 1), and UMTS 602 may comprise first and/or second cells and/or network entities serving these or other cells. In this example, the UTRAN 602 provides various wireless services including telephony, video, data, messaging, broadcasts, and/or other services. The UTRAN 602 may include a plurality of Radio Network Subsystems (RNSs) such as an RNS 607, each controlled by a respective Radio Network Controller (RNC) such as an RNC 606. Here, the UTRAN 602 may include any number of RNCs 606 and RNSs 607 in addition to the RNCs 606 and RNSs 607 illustrated herein. The RNC 606 is an apparatus responsible for, among other things, assigning, reconfiguring, and releasing radio resources within the RNS 607. The RNC 606 may be interconnected to other RNCs (not shown) in the UTRAN 602 through various types of interfaces such as a direct physical connection, a virtual network, or the like, using any suitable transport network.

Communication between a UE 610 and a NodeB 608 may be considered as including a physical (PHY) layer and a medium access control (MAC) layer. Further, communication between a UE 610 and an RNC 606 by way of a respective NodeB 608 may be considered as including a radio resource control (RRC) layer. In the instant specification, the PHY layer may be considered layer 1; the MAC layer may be considered layer 6; and the RRC layer may be considered layer 3. Information hereinbelow utilizes terminology introduced in the RRC Protocol Specification, 3GPP TS 65.331 v9.1.0, incorporated herein by reference.

The geographic region covered by the RNS 607 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 608 are shown in each RNS 607; however, the RNSs 607 may include any number of wireless Node Bs. The Node Bs 608 provide wireless access points to a CN 604 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 610 may further include a universal subscriber identity module (USIM) 611, which contains a user's subscription information to a network. For illustrative purposes, one UE 610 is shown in communication with a number of the Node Bs 608. The DL, also called the forward link, refers to the communication link from a NodeB 608 to a UE 610, and the UL, also called the reverse link, refers to the communication link from a UE 610 to a NodeB 608.

The CN 604 interfaces with one or more access networks, such as the UTRAN 602. As shown, the CN 604 is a GSM core network. However, as those skilled in the art will recognize, the various concepts presented throughout this disclosure may be implemented in a RAN, or other suitable access network, to provide UEs with access to types of CNs other than GSM networks.

The CN 604 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 604 supports circuit-switched services with a MSC 612 and a GMSC 614. In some applications, the GMSC 614 may be referred to as a media gateway (MGW). One or more RNCs, such as the RNC 606, may be connected to the MSC 612. The MSC 612 is an apparatus that controls call setup, call routing, and UE mobility functions. The MSC 612 also includes a VLR that contains subscriber-related information for the duration that a UE is in the coverage area of the MSC 612. The GMSC 614 provides a gateway through the MSC 612 for the UE to access a circuit-switched network 616. The GMSC 614 includes a home location register (HLR) 615 containing subscriber data, such as the data reflecting the details of the services to which a particular user has subscribed. The HLR is also associated with an authentication center (AuC) that contains subscriber-specific authentication data. When a call is received for a particular UE, the GMSC 614 queries the HLR 615 to determine the UE's location and forwards the call to the particular MSC serving that location.

The CN 604 also supports packet-data services with a serving GPRS support node (SGSN) 618 and a gateway GPRS support node (GGSN) 620. GPRS, which stands for General Packet Radio Service, is designed to provide packet-data services at speeds higher than those available with standard circuit-switched data services. The GGSN 620 provides a connection for the UTRAN 602 to a packet-based network 622. The packet-based network 622 may be the Internet, a private data network, or some other suitable packet-based network. The primary function of the GGSN 620 is to provide the UEs 610 with packet-based network connectivity. Data packets may be transferred between the GGSN 620 and the UEs 610 through the SGSN 618, which performs primarily the same functions in the packet-based domain as the MSC 612 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a NodeB 608 and a UE 610. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 610 provides feedback to the node B 608 over the HS-DPCCH to indicate whether it correctly decoded a packet on the downlink.

HS-DPCCH further includes feedback signaling from the UE 610 to assist the node B 608 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 608 and/or the UE 610 may have multiple antennas supporting MIMO technology. The use of MIMO technology enables the node B 608 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 610 to increase the data rate or to multiple UEs 610 to increase the overall system capacity. This is achieved by spatially precoding each data stream and then transmitting each spatially precoded stream through a different transmit antenna on the downlink. The spatially precoded data streams arrive at the UE(s) 610 with different spatial signatures, which enables each of the UE(s) 610 to recover the one or more the data streams destined for that UE 610. On the uplink, each UE 610 may transmit one or more spatially precoded data streams, which enables the node B 608 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 7:
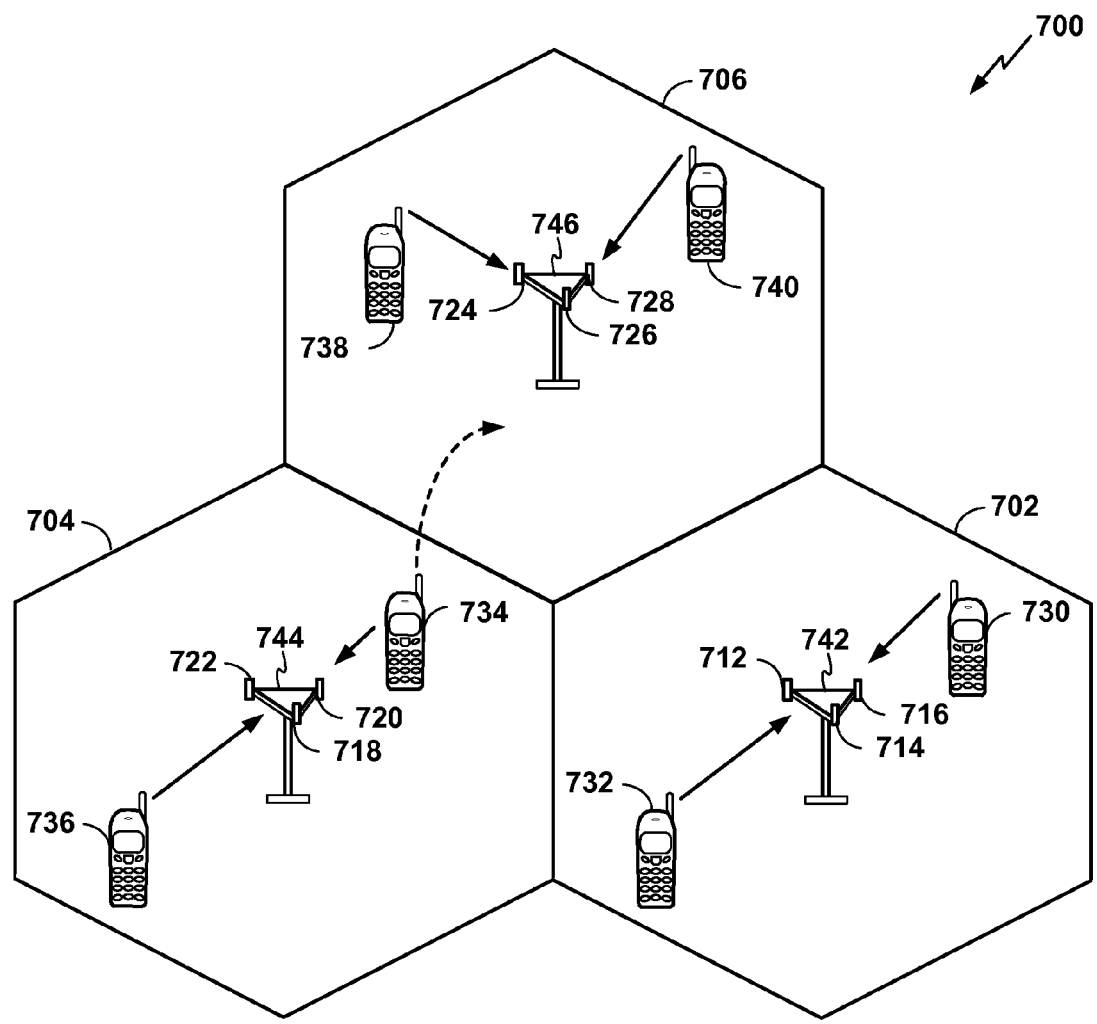
FIG. 7 is a conceptual diagram illustrating an example of an access network.

Referring to FIG. 7, an access network 700 in a UTRAN architecture is illustrated. The multiple access wireless communication system includes multiple cellular regions (cells), including cells 702, 704, and 706, each of which may include one or more sectors. The multiple sectors can be formed by groups of antennas with each antenna responsible for communication with UEs in a portion of the cell. For example, in cell 702, antenna groups 712, 714, and 716 may each correspond to a different sector. In cell 704, antenna groups 718, 720, and 722 each correspond to a different sector. In cell 706, antenna groups 724, 726, and 728 each correspond to a different sector. The cells 702, 704 and 706 may include several wireless communication devices, e.g., User Equipment or UEs, which may be in communication with one or more sectors of each cell 702, 704 or 706. For example, UEs 730 and 732 may be in communication with NodeB 742, UEs 734 and 736 may be in communication with NodeB 744, and UEs 738 and 740 can be in communication with NodeB 746. Here, each NodeB 742, 744, 746 is configured to provide an access point to a core network for all the UEs 730, 732, 734, 736, 738, 740 in the respective cells 702, 704, and 706.

As the UE 734 moves from the illustrated location in cell 704 into cell 706, a serving cell change (SCC) or handover may occur in which communication with the UE 734 transitions from the cell 704, which may be referred to as the source cell, to cell 706, which may be referred to as the target cell. Management of the handover procedure may take place at the UE 734, at the Node Bs corresponding to the respective cells, at a radio network controller 606 (FIG. 6), or at another suitable node in the wireless network. For example, during a call with the source cell 704, or at any other time, the UE 734 may monitor various parameters of the source cell 704 as well as various parameters of neighboring cells such as cells 706 and 702. Further, depending on the quality of these parameters, the UE 734 may maintain communication with one or more of the neighboring cells. During this time, the UE 734 may maintain an Active Set, that is, a list of cells that the UE 734 is simultaneously connected to (i.e., the UTRA cells that are currently assigning a downlink dedicated physical channel DPCH or fractional downlink dedicated physical channel F-DPCH to the UE 734 may constitute the Active Set).

The modulation and multiple access scheme employed by the access network 700 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 8:
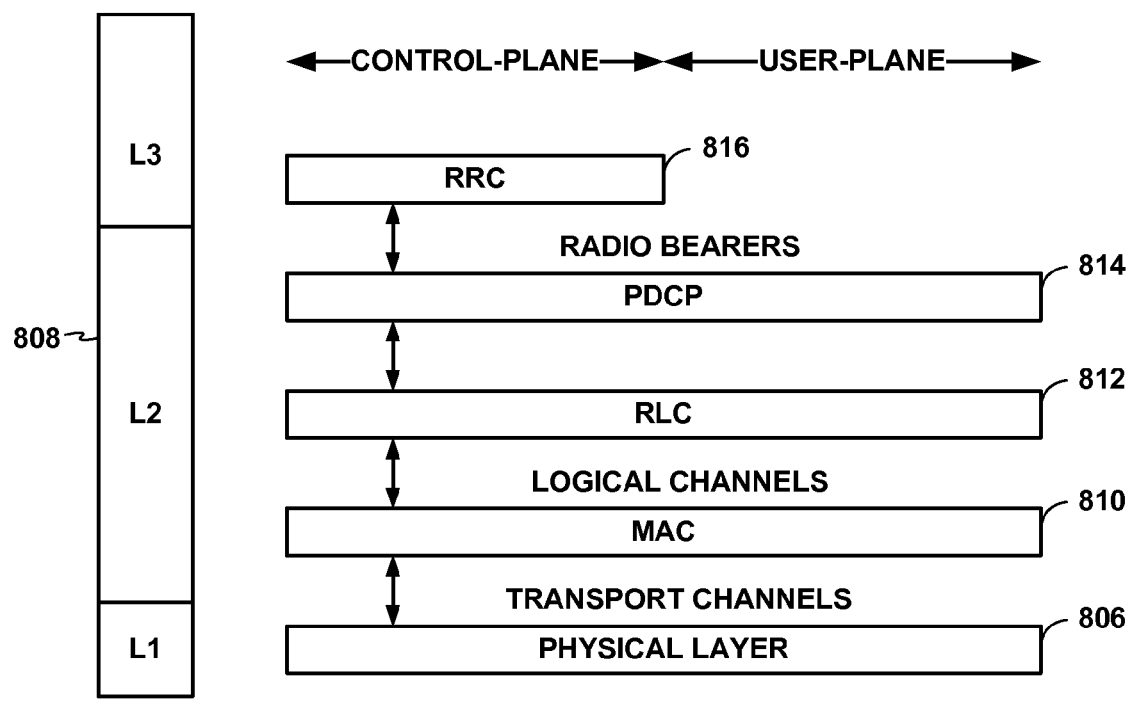
FIG. 8 is a conceptual diagram illustrating an example of a radio protocol architecture for the user and control plane.

The radio protocol architecture may take on various forms depending on the particular application. An example for an HSPA system will now be presented with reference to FIG. 8. FIG. 8 is a conceptual diagram illustrating an example of the radio protocol architecture for the user and control planes.

Turning to FIG. 8, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 806. Layer 2 (L2 layer) 808 is above the physical layer 806 and is responsible for the link between the UE and node B over the physical layer 806.

In the user plane, the L2 layer 808 includes a media access control (MAC) sublayer 810, a radio link control (RLC) sublayer 812, and a packet data convergence protocol (PDCP) 814 sublayer, which are terminated at the node B on the network side. Although not shown, the UE may have several upper layers above the L2 layer 808 including a network layer (e.g., IP layer) that is terminated at a PDN gateway on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between NodeBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

Figure 9:
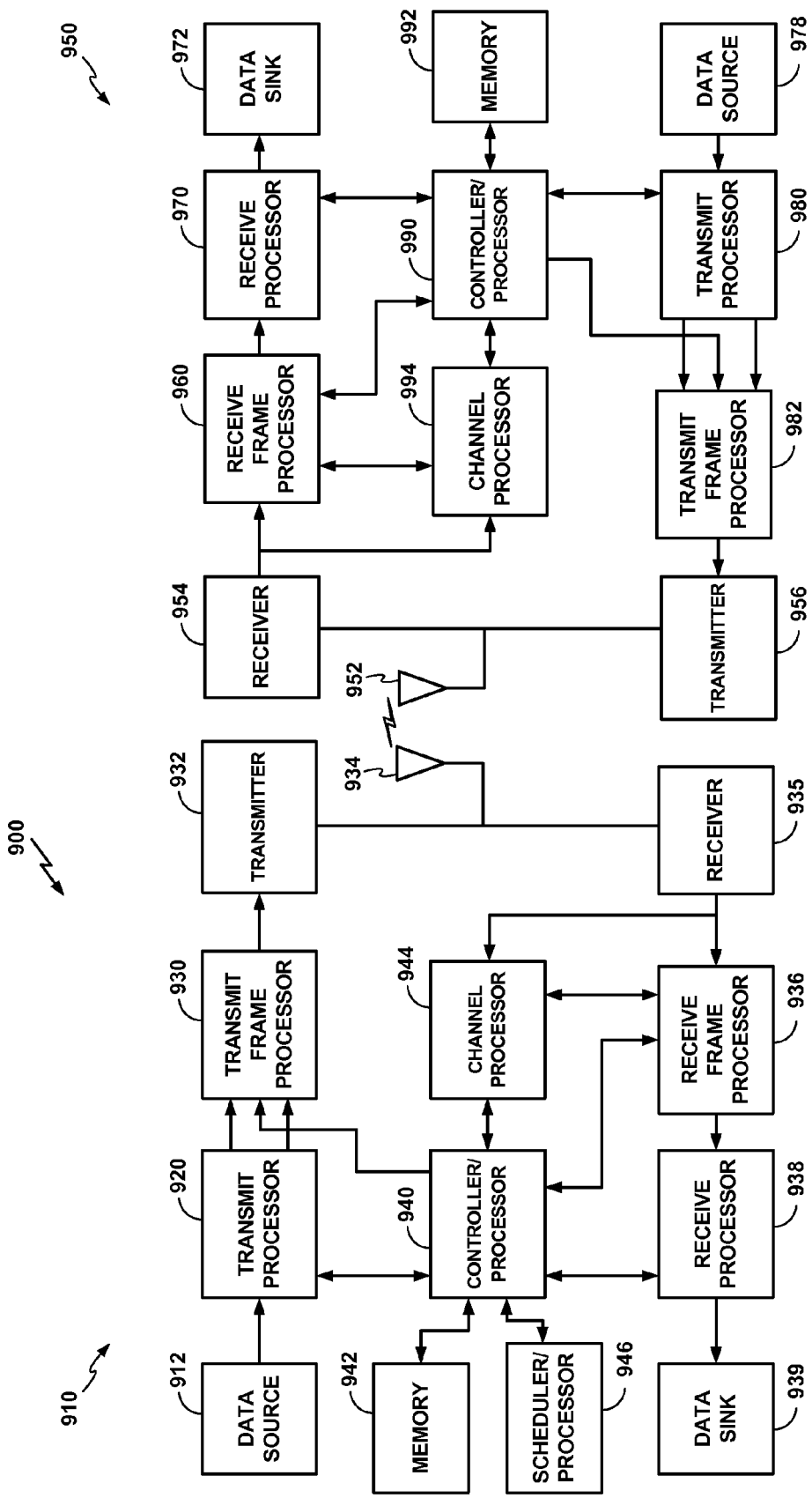
FIG. 9 is a block diagram conceptually illustrating an example of a Node B in communication with a UE in a telecommunications system.

FIG. 9 is a block diagram of a NodeB 910 in communication with a UE 950, where the NodeB 910 may be the NodeB 1008 in FIG. 6 and/or macro network entity 102 of FIG. 1, and the UE 950 may be the UE 610 in FIG. 6 and/or cellular phone 104 of FIG. 1. In the downlink communication, a transmit processor 920 may receive data from a data source 912 and control signals from a controller/processor 940. The transmit processor 920 provides various signal processing functions for the data and control signals, as well as reference signals (e.g., pilot signals). For example, the transmit processor 920 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 944 may be used by a controller/processor 940 to determine the coding, modulation, spreading, and/or scrambling schemes for the transmit processor 920. These channel estimates may be derived from a reference signal transmitted by the UE 950 or from feedback from the UE 950. The symbols generated by the transmit processor 920 are provided to a transmit frame processor 930 to create a frame structure. The transmit frame processor 930 creates this frame structure by multiplexing the symbols with information from the controller/processor 940, resulting in a series of frames. The frames are then provided to a transmitter 932, which provides various signal conditioning functions including amplifying, filtering, and modulating the frames onto a carrier for downlink transmission over the wireless medium through antenna 934. The antenna 934 may include one or more antennas, for example, including beam steering bidirectional adaptive antenna arrays or other similar beam technologies.

At the UE 950, a receiver 954 receives the downlink transmission through an antenna 952 and processes the transmission to recover the information modulated onto the carrier. The information recovered by the receiver 954 is provided to a receive frame processor 960, which parses each frame, and provides information from the frames to a channel processor 994 and the data, control, and reference signals to a receive processor 970. The receive processor 970 then performs the inverse of the processing performed by the transmit processor 920 in the NodeB 910. More specifically, the receive processor 970 descrambles and despreads the symbols, and then determines the most likely signal constellation points transmitted by the NodeB 910 based on the modulation scheme. These soft decisions may be based on channel estimates computed by the channel processor 994. The soft decisions are then decoded and deinterleaved to recover the data, control, and reference signals. The CRC codes are then checked to determine whether the frames were successfully decoded. The data carried by the successfully decoded frames will then be provided to a data sink 972, which represents applications running in the UE 950 and/or various user interfaces (e.g., display). Control signals carried by successfully decoded frames will be provided to a controller/processor 990. When frames are unsuccessfully decoded by the receiver processor 970, the controller/processor 990 may also use an acknowledgement (ACK) and/or negative acknowledgement (NACK) protocol to support retransmission requests for those frames.

In the uplink, data from a data source 978 and control signals from the controller/processor 990 are provided to a transmit processor 980. The data source 978 may represent applications running in the UE 950 and various user interfaces (e.g., keyboard). Similar to the functionality described in connection with the downlink transmission by the NodeB 910, the transmit processor 980 provides various signal processing functions including CRC codes, coding and interleaving to facilitate FEC, mapping to signal constellations, spreading with OVSFs, and scrambling to produce a series of symbols. Channel estimates, derived by the channel processor 994 from a reference signal transmitted by the NodeB 910 or from feedback contained in the midamble transmitted by the NodeB 910, may be used to select the appropriate coding, modulation, spreading, and/or scrambling schemes. The symbols produced by the transmit processor 980 will be provided to a transmit frame processor 982 to create a frame structure. The transmit frame processor 982 creates this frame structure by multiplexing the symbols with information from the controller/processor 990, resulting in a series of frames. The frames are then provided to a transmitter 956, which provides various signal conditioning functions including amplification, filtering, and modulating the frames onto a carrier for uplink transmission over the wireless medium through the antenna 952.

The uplink transmission is processed at the NodeB 910 in a manner similar to that described in connection with the receiver function at the UE 950. A receiver 935 receives the uplink transmission through the antenna 934 and processes the transmission to recover the information modulated onto the carrier. The information recovered by the receiver 935 is provided to a receive frame processor 936, which parses each frame, and provides information from the frames to the channel processor 944 and the data, control, and reference signals to a receive processor 938. The receive processor 938 performs the inverse of the processing performed by the transmit processor 980 in the UE 950. The data and control signals carried by the successfully decoded frames may then be provided to a data sink 939 and the controller/processor, respectively. If some of the frames were unsuccessfully decoded by the receive processor, the controller/processor 940 may also use an acknowledgement (ACK) and/or negative acknowledgement (NACK) protocol to support retransmission requests for those frames.

The controller/processors 940 and 990 may be used to direct the operation at the NodeB 910 and the UE 950, respectively. For example, the controller/processors 940 and 990 may provide various functions including timing, peripheral interfaces, voltage regulation, power management, and other control functions. The computer readable media of memories 942 and 992 may store data and software for the NodeB 910 and the UE 950, respectively. A scheduler/processor 946 at the NodeB 910 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for carrying out a wireless call at a small base station, comprising:
    establishing communication with a cellular phone and a fixed phone;
    transmitting a connection command message to the cellular phone and/or the fixed phone commanding the cellular phone and/or the fixed phone to establish a communicative connection between the cellular phone and the fixed phone;
    receiving a cellular phone call indication message from a network indicating an existence of an incoming call request for the cellular phone;
    transmitting a paging message associated with the incoming call request to the cellular phone; and
    executing a call with a third phone associated with the incoming call request, wherein the call is conducted by the fixed phone over the communicative connection established between the cellular phone and the fixed phone.

2. The method of claim 1, wherein establishing communication with the cellular phone comprises handing off the cellular phone from a network entity to the small base station, wherein the network entity previously served as a serving cell for the cellular phone.

3. The method of claim 1, wherein establishing communication with the cellular phone comprises registering the cellular phone with the small base station.

4. The method of claim 1, wherein the communicative connection comprises a Bluetooth connection.

5. The method of claim 1, wherein the communicative connection comprises a Universal Serial Bus (USB) connection.

6. The method of claim 1, wherein establishing communication with the cellular phone further comprises determining whether the cellular phone is a subscriber device associated with the small base station.

7. The method of claim 6, further comprising initiating communication establishment with the cellular phone where the cellular phone is determined to be the subscriber device.

8. The method of claim 6, further comprising denying communication establishment with the cellular phone where the cellular phone is not determined to be the subscriber device.

9. An apparatus for carrying out a wireless call at a small base station, comprising:
 means for establishing communication with a cellular phone and a fixed phone;
 means for transmitting a connection command message to the cellular phone and/or the fixed phone commanding the cellular phone and/or the fixed phone to establish a communicative connection between the cellular phone and the fixed phone;
 means for receiving a cellular phone call indication message from a network indicating an existence of an incoming call request for the cellular phone;
 means for transmitting a paging message associated with the incoming call request to the cellular phone; and
 means for executing a call with a third phone associated with the incoming call request, wherein the call is conducted by the fixed phone over the communicative connection established between the cellular phone and the fixed phone.

10. The apparatus of claim 9, wherein the means for establishing communication with the cellular phone comprises means for handing off the cellular phone from a network entity to the small base station, wherein the network entity previously served as a serving cell for the cellular phone.

11. The apparatus of claim 9, wherein the means for establishing communication with the cellular phone comprises means for registering the cellular phone with the small base station.

12. The apparatus of claim 9, wherein the communicative connection comprises a Bluetooth connection.

13. The apparatus of claim 9, wherein the communicative connection comprises a Universal Serial Bus (USB) connection.

14. The apparatus of claim 9, wherein the means for establishing communication with the cellular phone further comprises means for determining whether the cellular phone is a subscriber device associated with the small base station.

15. The apparatus of claim 14, further comprising means for initiating communication establishment with the cellular phone where the cellular phone is determined to be the subscriber device.

16. The apparatus of claim 14, further comprising means for denying communication establishment with the cellular phone where the cellular phone is not determined to be the subscriber device.

17. A non-transitory computer-readable medium for carrying out a wireless call at a small base station comprising code for:
 establishing communication with a cellular phone and a fixed phone;
 transmitting a connection command message to the cellular phone and/or the fixed phone commanding the cellular phone and/or the fixed phone to establish a communicative connection between the cellular phone and the fixed phone;
 receiving a cellular phone call indication message from a network indicating an existence of an incoming call request for the cellular phone;
 transmitting a paging message associated with the incoming call request to the cellular phone; and
 executing a call with a third phone associated with the incoming call request, wherein the call is conducted by the fixed phone over the communicative connection established between the cellular phone and the fixed phone.

18. The computer-readable medium of claim 17, wherein the code for establishing communication with the cellular phone comprises code for handing off the cellular phone from a network entity to the small base station, wherein the network entity previously served as a serving cell for the cellular phone.

19. The computer-readable medium of claim 17, wherein the code for establishing communication with the cellular phone comprises code for registering the cellular phone with the small base station.

20. The computer-readable medium of claim 17, wherein the communicative connection comprises a Bluetooth connection.

21. The computer-readable medium of claim 17, wherein the communicative connection comprises a Universal Serial Bus (USB) connection.

22. The computer-readable medium of claim 17, wherein the code for establishing communication with the cellular phone further comprises code for determining whether the cellular phone is a subscriber device associated with the small base station.

23. The computer-readable medium of claim 22, wherein the computer-readable medium further comprises code for initiating communication establishment with the cellular phone where the cellular phone is determined to be the subscriber device.

24. The computer-readable medium of claim 22, wherein the computer-readable medium further comprises code for denying communication establishment with the cellular phone where the cellular phone is not determined to be the subscriber device.

25. An apparatus for carrying out a wireless call at a small base station, comprising:
 at least one processor; and
 a memory coupled to the at least one processor, wherein the at least one processor is configured to:
  establish communication with a cellular phone and a fixed phone;
  transmit a connection command message to the cellular phone and/or the fixed phone commanding the cellular phone and/or the fixed phone to establish a communicative connection between the cellular phone and the fixed phone;
  receive a cellular phone call indication message from a network indicating an existence of an incoming call request for the cellular phone;
  transmit a paging message associated with the incoming call request to the cellular phone; and
  execute a call with a third phone associated with the incoming call request, wherein the call is conducted by the fixed phone over the communicative connection established between the cellular phone and the fixed phone.

26. The apparatus of claim 25, wherein establishing communication with the cellular phone comprises handing off the cellular phone from a network entity to the small base station, wherein the network entity previously served as a serving cell for the cellular phone.

27. The apparatus of claim 25, wherein establishing communication with the cellular phone comprises registering the cellular phone with the small base station.

28. The apparatus of claim 25, wherein the communicative connection comprises a Bluetooth connection.

29. The apparatus of claim 25, wherein the communicative connection comprises a Universal Serial Bus (USB) connection.

30. The apparatus of claim 25, wherein establishing communication with the cellular phone further comprises determining whether the cellular phone is a subscriber device associated with the small base station.

31. The apparatus of claim 30, wherein the at least one processor is further configured to initiate communication establishment with the cellular phone where the cellular phone is determined to be the subscriber device.

32. The apparatus of claim 30, wherein the at least one processor is further configured to deny communication establishment with the cellular phone where the cellular phone is not determined to be the subscriber device.

* * * * *